United States Patent [19]
Sakurai

[11] 3,876,975
[45] Apr. 8, 1975

[54] SUPERVISORY SYSTEM FOR AUTOMOBILE HEADLAMP CIRCUIT

[75] Inventor: Yasuhhiko Sakurai, Kariya, Japan

[73] Assignee: Nippondenso Co., Ltd., Kariya-shi, Japan

[22] Filed: Sept. 27, 1973

[21] Appl. No.: 401,379

[30] Foreign Application Priority Data
Sept. 28, 1972 Japan................................ 47-97837

[52] U.S. Cl............. 340/52 R; 307/10 LS; 315/82; 340/251
[51] Int. Cl............................................ B60q 1/00
[58] Field of Search.................. 340/52 R, 251, 411; 307/10 LS; 315/82, 129; 180/103

[56] References Cited
UNITED STATES PATENTS

| | | | |
|---|---|---|---|
| 3,622,974 | 11/1971 | Best et al. | 340/52 R |
| 3,623,055 | 11/1971 | Sakurai | 340/251 |
| 3,643,248 | 2/1972 | Schott | 340/52 R |
| 3,753,224 | 8/1973 | Martin | 340/251 |

*Primary Examiner*—Glen R. Swann, III
*Attorney, Agent, or Firm*—Cushman, Darby & Cushman

[57] ABSTRACT

A supervisory system for an automobile headlamp circuit comprises a faulty lamp detector including a pair of level detecting relays, one of the relays having a current-responsive coil connected in series with a plurality of driving headlamps and an associated voltage-responsive coil, the other of the relays having a current-responsive coil connected in series with a plurality of passing headlamps and an associated voltage-responsive coil, a check unit adapted to operate for a predetermined time interval upon the closing of an automobile key switch, and a supervisory indicator for indicating the presence of a failure or fault.

3 Claims, 2 Drawing Figures

SUPERVISORY SYSTEM FOR AUTOMOBILE HEADLAMP CIRCUIT

BACKGROUND OF THE INVENTION

1. Field of the Invention

The present invention relates to a supervisory system for the occurrence of fault in an automobile headlamp circuit.

2. Description of the Prior Art

While the questions associated with the safety of automobiles have become increasingly important, attempts have also been made to increase the number of headlamps to be installed in an automobile and improve the actuating circuits therefore.

SUMMARY OF THE INVENTION

In view of these circumstances, it is an object of the present invention to provide a supervisory system for an autombile headlamp circuit which indicates the occurrence of a lamp fault and at the same time checks for the presence of a fault in the supervisory indicator (e.g., a pilot lamp), a burned out fuse, etc.

It is another object of the present invention to provide a supervisory system for an automobile headlamp circuit which achieves the several functions with assurance in that there is provided a check unit adapted to operate for a predetermined time interval upon closing of an automobile key switch whereby, while the check unit is in opeation, the failure of a supervisory indicator (e.g., a pilot lamp), the burn-out of the fuse for the headlamp circuit, the total failure of either the driving headlamps or the passing headlamps or both, the failure of a faulty headlamp detector and the failure of headlamp selector switch can be checked independently of the operation of a headlamp lighting switch to allow the supervisory indicator, e.g., the pilot lamp to be lit only when there is no failure or fault, whereas after the completion of the operation of the check unit, that is, when the automobile is running with either the driving headlamps or the passing headlamps turned on, the failure of one or more of the operated headlamps or the total failure of the turned-off headlamps can be indicated by the lighting of the pilot lamp.

It is still another object of the present invention to provide a supervisory system for a headlamp circuit wherein a headlamp fault detector comprises a pair of level detecting relays respectively associated with a plurality of driving headlamps and a plurality of passing headlamps and composed of a current-responsive coil, a voltage-responsive coil and normally open contacts and there are provided transistors, diodes and resistors, whereby the level detecting relays are operated electrically in such a manner that the falure of one or more of the headlamps in operation is detected by the combined magnetomotive forces of the current-responsive and voltage-responsive coils in the associated level detecting relay, while the total failure of the headlamps not in operation is detected only by the voltage coil in the associated level detecting relay.

It is still another object of the present invention to provide a supervisory system for a headlamps circuit wherein the normally open contacts of one level detecting relay are connected in series with the normally open contacts of the other level detecting relay whereby the contact circuit is closed when there is no failure or fault, and transistors, diodes and resistors are provided in such a manner that when a check unit is in operation a pilot lamp is directly operated by the contact circuit, whereas after the completion of the operation of the check unit, the pilot lamp is operated by the contact circuit in a reverse mode.

According to the novel constructions of the system according to this invention, there are remarkable advantages as follows:

1. A highly reliable headlamp fault supervisory system may be obtained in which the failure of one or more headlamps in a plurality of parallel connected headlamps in operation can be detected and at the same time the total failure of another plurality of parallel connected headlamps not in operation can also be detected.

2. A highly reliable lamp fault supervisory system may be obtained in which during the checking time, even with the headlamps being turned off, the most serious failure, e.g., the total failure of the driving headlamps or the passing headlamps or of both can be detected and the operating conditions of a headlamp selector switch in the closed position can also be detected.

DESCRIPTION OF THE PREFERRED EMBODIMENT

Figure 1:
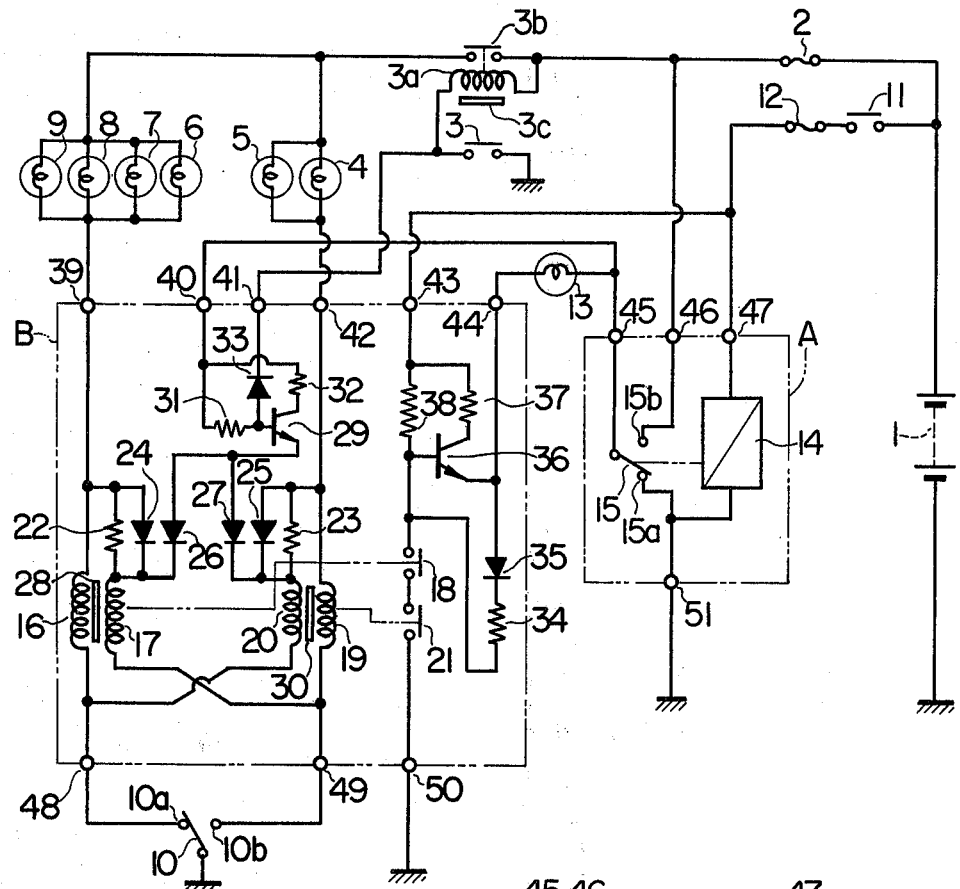
FIG. 1 is an electric wiring diagram showing an embodiment of a supervisory system for automobile headlamp circuit according to the present invention.

The construction of the system of this invention will now be described with reference to an illustrative embodiment shown in the drawings. Referring to FIG. 1, numeral 1 designates a power supply consisting of a battery installed in an automobile. Numeral 2 designates a fuse for a headlamp circuit, numeral 3 a headlamp lighting switch, numeral 3a a voltage coil adapted to be energized upon the closing of the headlamp lighting switch 3 to operate normally open contacts 3b and wound on an iron core 3c. Numerals 4 and 5 designate passing headlamps for illuminating the nearside of the road in the direction of the movement of the vehicle, numerals 6, 7, 8 and 9 driving headlamps for illuminating the farside of the road in the direction of the movement of the vehicle. The passing headlamps 4 and 5 are connected in parallel and so are the driving headlamps 6, 7, 8 and 9. Numeral 10 designates a headlamp selector switch, numeral 10a a driving contact, numeral 10b a passing contact, numeral 11 a key switch, numeral 12 a fuse, numeral 13 a pilot lamp constituting a supervisory indicator which may be substituted by a buzzer or the like. Symbol A designates a check unit comprising a timing drive section 14 and a transfer contact 15, numeral 15a a normally closed contact of the transfer contact 15, numeral 15b a normally open contact of the transfer contact 15. Symbol B designates a fault detector in which numeral 16 designates a current-responsive coil, numeral 17 a voltage-responsive coil, the coils 16 and 17 being wound on the same iron core 28. Numeral 18 designates normally open contacts adapted to be operated by the coils 16 and 17 with which it constitutes a level detecting relay. Numeral 19 designates a current-responsive coil, numeral 20 a voltage-responsive coil, the coils 19 and 20 being wound on the same iron core 30. Numeral 21 designates normally open contacts adapted to be operated by the coils 19 and 20 and constituting another level detecting relay therewith. Numerals 22 and 23 designate resistors, 24 and 25 diodes respectively connected in parallel with the resistors 22 and 23 and in series with the voltage-responsive coils 17 and 20 along with the resistors 22 and 23. Numerals 26 and 27 designate diodes, numeral 29 a NPN transistor having its emitter connected to the voltage-responsive coils 17 and 20 to supply power thereto, with diodes 26 and 27 inserted therebetween in the forward direction. Numeral 31 designates a resistor connected to the base of the transistor 29, 32 a resistor connected to the collector of the transistor 29. The base of the transistor 29 is arranged so that it is grounded through a diode 33 upon the closing of the headlamp lighting switch 3. Numeral 34 designates a resistor, numeral 35 a diode connected in series with the resistor 34 to operate the pilot lamp 13 through the normally open contacts 18 and 21. Numeral 36 designates a NPN transistor, numerals 37 and 38 resistors respectively connected to the collector and the base of the transistor 36 whose base is connected so that it is grounded through the normally open contacts 18 and 21. Numerals 39, 40, 41, 42, 43, 44, 45, 46, 47, 48, 49, 50 and 51 designate terminals.

Figure 2:
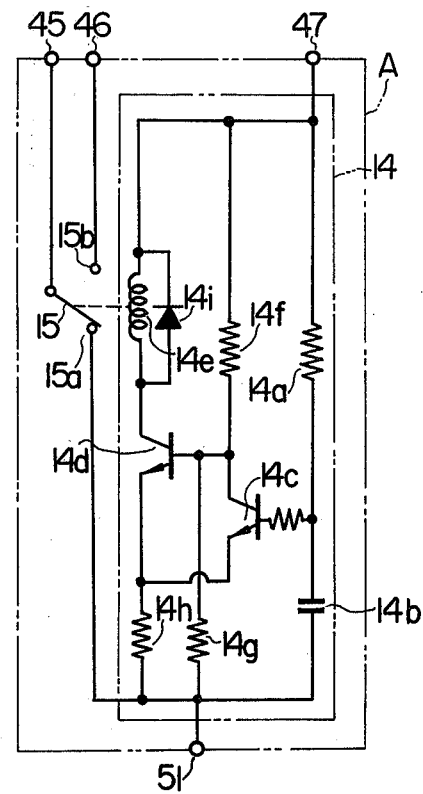
FIG. 2 is an electic wiring diagram showing a specific construction of the check unit used in the system of FIG. 1.

FIG. 2 shows the detailed construction of the check unit A. When the power supply voltage is applied to the terminal 47 by the closing of the key switch 11, a charging current flows into a capacitor 14b through a resistor 14a to charge the capacitor 14b. In this case, the voltage across the capacitor 14b during the initial period of the charging is not sufficient to render a transistor 14c conductive and thus the transistor 14c is in the nonconductive state. A transistor 14d which forms a Schmitt circuit with the transistor 14c is in the conductive state and consequently a relay coil 14e is energized causing the transfer contact 15 to contact the normally open contact 15b. When, after the expiration of a predetermined time, the voltage across the capacitor 14b reaches a value which causes conduction between the base and the emitter of the transistor 14c, the transistor 14c is rendered conductive and the transistor 14d is rendered nonconductive. Consequently, the relay coil 14e is deenergized causing the transfer contact 15 to return to the normally closed contact 15a. In other words, the check unit A is constructed so that after the application of the power supply voltage to the terminal 47, the transfer contact 15 comes into and remains in contact with the normally open contact 15b for a predetermined period of for example 10 seconds. Numerals 14f, 14g and 14h designate resistors and numeral 14i a diode.

With this construction, the operation of this embodiment will be described. The operation will be described with reference to the illustrated conditions in which the headlamp selector switch 10 is in contact with the driving headlamp contact 10a. When the key switch 11 is closed, the power is supplied to the timing drive section 14 of the check unit A so that the transfer contact 15 comes into and stay in contact with the normally open contact 15b for a predetermined time as previously mentioned and thus the power is supplied to the pilot lamp 13 and the collector and base circuits of the transistor 29 through the fuse 2 in the headlamp circuit. When the headlamp lighting switch 3 is open and the headlamps 4, 5, 6, 7, 8 and 9 are turned off, the transistor 29 is rendered conductive so that the voltage coil 20 is energized through the emitter of the transistor 29, the diode 27, the voltage coil 20 and the selector switch 10 to close the normally open contacts 21. Also, through the emitter of the transistor 29, the diode 26, the voltage coil 17, the current coil 19, the passing headlamps 4 and 5, the driving headlamps 6, 7, 8, and 9, the current coil 16 and the selector switch 10, the voltage coil 17 is energized to close the normally open contacts 18. As the result of the closing of the normally open contacts 18 and 21, that side of the pilot lamp 13 opposite to the power supply is grounded through the diode 35, the resistor 34 and the normally open contacts 18 and 21 to light the pilot lamp 13. The base of the transistor 36 is grounded through the normally open contacts 18 and 21 and it is thus rendered nonconductive. In this case, in order that the pilot lamp 13 may be lit, it is essential that in addition to the pilot lamp 13 being in the normal condition, the fuses 2 and 12, the key switch 11, the check unit A, the detector B and the contact 10a side of the selector switch 10 are functioning normally and at the same time either one of the passing headlamps 4 and 5 and one of the driving headlamps 6, 7, 8 and 9 are functioning normally. In other words, when the pilot lamp 13 is lit, it indicates that the above-mentioned requirements are properly satisfied, whereas if the pilot lamp 13 fails to be lit, it indicates the presence of any faulty element.

On the other hand, when the headlamp lighting switch 3 is closed the power is supplied through the normally open contacts 3b, the current coil 16 and the selector switch 10 to the driving headlamps 6, 7, 8 and 9 to light them.

In this case, the passing headlamps 4 and 5 are turned off but nevertheless a power supply potential is applied to the current-responsive coil 19 through the headlamps 4 and 5. Consequently, the potential is also supplied one end of the voltage-responsive coil 17 through the current-responsive coil 19. Since the other end of the voltage-responsive coil 17 is grounded through the resistor 22, the current-responsive coil 16 and the selector switch 10, a small magnetomotive force is produced in the voltage-responsive coil 17 and this magnetomotive force acts to oppose the magnetomotive forces produced by the load currents of the driving headlamps 6, 7, 8 and 9. It is designed so that the normally open contacts 18 are closed by the combined magnetomotive force of the current-responsive coil 16 and the voltage-responsive coil 17 only when all of the driving headlamps 6, 7, 8 and 9 are normally operated. Therefore, the normally open contacts 18 are not closed if one or more of the driving headlamps 6, 7, 8, and 9 are faulty. Since the base of the transistor 29 is grounded through the diode 33 and the headlamp lighting switch 3, the transistor 29 is rendered nonconductive and thus it has no effect on the operation of the circuit. The voltage-responsive coil 20 is supplied and energized through the diode 25 from the passing headlaps 4 and 5 which are not in operation and therefore the normally open contacts 21 are closed. As a result, when both or either one of the passing headlamps 4 and 5 not in operation is functioning normally, the voltage-responsive coil 20 is energized to close the normally open contacts 21, whereas when both of the passing headlamps are faulty, the normally open contacts 21 are not closed. As in the previously described case where the headlamps are not in operation, the pilot lamp 13 is lit only when both of the normally open contacts 18 and 21 are closed. Therefore, if the pilot lamp 13 is turned on, it indicates that not only the pilot lamp 13 is functioning normally, but also the fuses 2 and 12, the key switch 11, the check unit A, the detector B and the contact 10a side of the selector switch 10 are in the normal condition, and all of the driving headlamps 6, 7, 8 and 9 in operation and at least one of the turned-off passing headlamps 4 and 5 are functioning normally. Further, if the pilot lamp 13 is not turned on, it indicates that there is a fault in any of these parts.

Then, when a predetermined time of for example 10 seconds expires after the closing of the key switch 11, the timing drive section 14 in the check unit A completes its operation and thus the transfer contact 15 is restored into contact with the normally closed contact 15a. When this occurs, the pilot lamp 13 and the collector and base circuits of the transistor 29 are grounded and now the transistor 29 has no effect on the operation of the circuit. Further, by connecting one side of the pilot lamp 13 to the ground through the transfer contact 15, the power is now supplied to the pilot lamp 13 from the emitter of the transistor 36. When the headlamps are in operation, in the exactly the same operation as previously mentioned, only in the event that both the normally open contacts 18 and 21 are closed by the fact that all of the operated driving headlamps 6, 7, 8, and 9 are functioning normally and at least one of the passing headlamps 4 and 5 not in operation is functioning normally, the base of the transistor 36 is grounded to render it nonconductive and thus the pilot lamp 13 is not turned on. In other words, the lighting of the pilot lamp 13 indicates that at least one of the driving headlamps 6, 7, 8 and 9 which are in operation is faulty or alternately both of the passing headlamps 4 and 5 which are not in operation are faulty or both of these states are present.

While the operation of this embodiment has been described with reference to the case where the headlamps selector switch 10 is in contact with the driving contact 10a, the system of this invention operates in a quite similar manner when the selector switch 10 is in contact with the passing contact 10b.

Further, while, in the above-described embodiment, the lighting circuit for the pilot lamp includes two sets of the normally open contacts connected in series with each other, the present invention can be carried out by using a circuit construction in which the two sets of the normally open contacts are connected in parallel with each other. Furthermore, in the above-described embodiment the transistor 29 used as a switching means may be replaced with a relay. Thus, the invention is not intended to be limited to the above-described embodiment and various changes and modifications may be made without departing in any way from the scope and spirit of the present invention.

I claim:

1. In an automobile headlamp circuit including a plurality of driving headlamps connected in parallel with one another, a plurality of passing headlamps connected in parallel with each other, lighting switch means, and lighting selection switch means, said lighting switch means and said lighting selection switch means inserted between said pluralities of headlamps and a power source, a supervisory system comprising a first and a second level detecting relays, said first level detecting relay having a current-responsive coil connected in series with said driving headlamps, a voltage-responsive coil and a set of contacts adapted to be operated by the combined magnetomotive force of said current-responsive and voltage-responsive coils, said second level detecting relay having a current-responsive coil connected in series with said passing headlamps, a voltage-responsive coil and a set of contacts adapted to be operated by the combined magnetomotive force of said current-responsive and voltage-responsive coils, one end of the voltage-responsive coil of said first level detecting relay being connected to a juncture of said driving headlamps and the current-responsive coil of said first level detecting relay, the other end of the voltage-responsive coil of said first level detecting relay being connected to a juncture of the current-responsive coil of said second level detecting relay and said lighting selector switch means, one end of the voltage-responsive coil of said second level detecting relay being connected to a juncture of said passing headlamps and the current-responsive coil of said second level detecting relay, the other end of the voltage-responsive coil of said second level detecting relay being connected to a juncture of the current-responsive coil of said first level detecting relay and said lighting selector switch means, one end of each of said driving headlamps and each of said passing headlamps being connected in common to said power source, and each of said voltage-responsive coils being energizable through the circuits of said driving headlamps and said passing headlamps, whereby the presence of a fault in said headlamp circuit is detected by the associated operations of said sets of contacts in said level detecting relay, and the results of said detection are indicated by a supervisory indicator.

2. A system according to claim 1, further comprising check means adapted to operate for a predetermined time interval in response to the closing of an automobile key switch, whereby the power circuits to said level detecting relays and said supervisory indicator are changed by said check means.

3. A system according to claim 2, further comprising switching means connected to said voltage-responsive coils and for energizing each of said voltage-responsive coils only when said pluralities of headlamps are not in operation and during the checking time of said check means.

* * * * *